US007515534B2

(12) United States Patent
Sumita

(10) Patent No.: US 7,515,534 B2
(45) Date of Patent: Apr. 7, 2009

(54) PRINTING APPARATUS AND RECEPTION BUFFER MANAGEMENT METHOD

(75) Inventor: Chisei Sumita, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 443 days.

(21) Appl. No.: 11/041,732

(22) Filed: Jan. 25, 2005

(65) Prior Publication Data

US 2005/0169290 A1 Aug. 4, 2005

(30) Foreign Application Priority Data

Jan. 29, 2004 (JP) ............................ 2004-021313

(51) Int. Cl.
*H04J 1/16* (2006.01)
*H04L 1/00* (2006.01)

(52) U.S. Cl. .................... 370/229; 370/230; 370/230.1; 370/231; 370/232; 370/235; 370/236; 370/236.1; 370/236.2; 370/389; 370/395.1; 358/1.1; 358/1.16; 710/52

(58) Field of Classification Search .................. 358/1.1, 358/1.16; 710/52; 370/229, 230, 230.1, 370/231, 232, 235, 236, 236.1, 236.2, 389, 370/395.1

See application file for complete search history.

(56) References Cited

U.S. PATENT DOCUMENTS 5,546,543 A * 8/1996 Yang et al. .................. 709/235
6,288,790 B1 * 9/2001 Yellepeddy et al. ........ 358/1.15
2003/0163619 A1 * 8/2003 Saito ........................... 710/56

FOREIGN PATENT DOCUMENTS

JP 2001-094613 4/2001

* cited by examiner

*Primary Examiner*—Edan Orgad
*Assistant Examiner*—Blanche Wong
(74) *Attorney, Agent, or Firm*—Fitzpatrick, Cella, Harper & Scinto

(57) ABSTRACT

There are provided a printing apparatus which can maintain an optimal transfer rate with an external device by an optimal buffer management, and a reception buffer management method thereof. In the printing apparatus according to this invention, assume that data received in unit of packet using a wireless interface from the external device is stored in a plurality of reception buffers. A maximum receivable data amount which can be used for receiving the data from the external device is determined on the basis of the number of the confirmed empty reception buffer(s). The data transmittable amount notified of the external device is then compared with the maximum receivable data amount. When receiving a request from the external device, the printing apparatus replies to the external device to change the notified data transmittable amount, in accordance with the comparison result.

8 Claims, 9 Drawing Sheets

604 RAM
602 ROM
601 MPU
605 SYSTEM BUS
603 ASIC
611a
660 WIRELESS COMMUNICATION I/F CONTROL UNIT
BUFFER 0
BUFFER 1
BUFFER 2
BUFFER N
659
656 BASEBAND
657 RF
658
655
652 WIRELESS COMMUNICATION I/F CONTROL UNIT
651 CPU
653 ROM
654 RAM
610

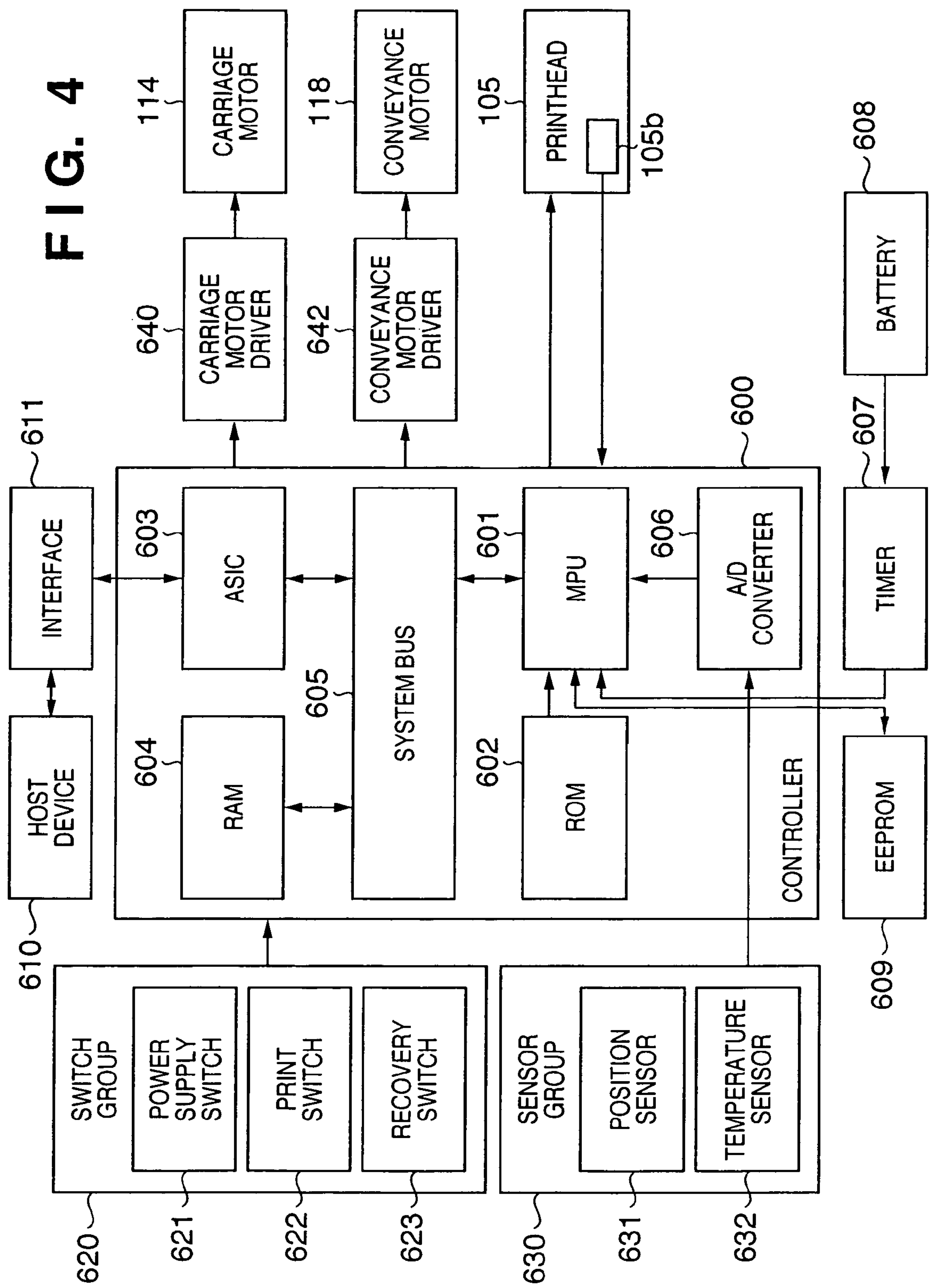
F I G. 4
CARRIAGE MOTOR
114
CONVEYANCE MOTOR
118
PRINTHEAD
105
105b
CARRIAGE MOTOR DRIVER
640
CONVEYANCE MOTOR DRIVER
642
BATTERY
608
INTERFACE
611
HOST DEVICE
610
ASIC
603
RAM
604
SYSTEM BUS
605
MPU
601
ROM
602
A/D CONVERTER
606
CONTROLLER
600
TIMER
607
EEPROM
609
SWITCH GROUP
620
POWER SUPPLY SWITCH
621
PRINT SWITCH
622
RECOVERY SWITCH
623
SENSOR GROUP
630
POSITION SENSOR
631
TEMPERATURE SENSOR
632

PRINTING APPARATUS AND RECEPTION BUFFER MANAGEMENT METHOD

FIELD OF THE INVENTION

This invention relates to a printing apparatus and a reception buffer management method and, more particularly, to a printing apparatus which receives data by packet data communication using a wireless interface such as Bluetooth, and performs printing by using an inkjet printhead, and a reception buffer management method of the printing apparatus.

BACKGROUND OF THE INVENTION

Conventionally, as one of wireless data communications, Bluetooth communication to which a spectrum spreading method is applied using the 2.4-GHz frequency band is available. In the Bluetooth communication, the data communication is performed in a packet switching method in which data is transmitted as a packet in a specific unit.

In the Bluetooth communication, a profile is defined according to an individual use condition, and the communication is controlled in accordance with the profile.

A Hardcopy Cable Replacement Profile (to be referred to as "HCRP" hereinafter), which is one of the profiles defines, in detail, a method of communicating between a host PC, and printer and/or scanner devices. The communication is performed via a Logical Link Control and Adaptation Protocol (to be referred to as "L2CAP" hereinafter) defined by Bluetooth. In the HCRP, the communication data is transmitted via a data channel to perform various control operations via a control channel.

The data flow control is defined to be implemented in a method of transmitting a credit which represents a data amount to be received by its own device via the data channel, to a communication partner via the control channel. Such process of transmitting the credit to the transmission side is also used in accordance with another protocol (e.g., Japanese Patent Publication Laid Open No. 2001-094613 (hereinafter referred to as "JPA 2001-094613")). As the maximum number of data to be transmitted as one packet via the data channel, a maximum transmission unit (to be referred to as an MTU hereinafter) determined by making a negotiation via the L2CAP layer is used. Since the minimum data transmission unit is 1 byte, the length of the data packet to be transferred may be ranging from 1-byte to MTU.

However, almost all the devices transmit data in unit of a transmittable maximum data amount of its own device when performing burst transfer in a case where the transmittable maximum data amount of its own device does not reach the MTU.

Alternatively, in a credit management method in the conventional packet communication, the credit is managed for each packet. Hence, as a hardware arrangement for the communication data transfer, there exists an apparatus which include a circuit capable of DMA-transferring, packet by packet, the data received in unit of packet, and continuously reading the data without being conscious of any packet break.

Generally, as a transmission/reception buffer in such hardware, a plurality of buffers having a specific capacity are provided to use one buffer for each packet. The received data packet is stored with the header and footer into a buffer. Then, the address and the number of bytes of transferred data of the data portion (excluding the header and the footer) of the data packet are examined, and the registration of transfer reservation is made in a specified transfer reservation FIFO. The same processing is performed on the subsequently received data packet, and the registration of transfer reservation is made according to a data reception sequence. For example, when a data analyzer such as MPU or ASIC reads the data portion stored in the buffer according to the registration sequence of the transfer reservation, and performs DMA-transfer. By performing the above process on the data stored in the plurality of buffers, it is possible to read each packet as continuous data. Packet data is sequentially read by activating the DMA, and a buffer from which all of the bytes have been transferred becomes available again. As a result, the number of available buffers is incremented.

However, in a case where the credit is managed in unit of the data amount according to the HCRP in the above-described conventional hardware arrangement, in consideration of one packet containing only 1-byte data, the transmittable credit byte is (the number of available packets×1 byte). Therefore, only an extremely small number of credits can be transmitted, thereby greatly reducing a transfer rate. JPA 2001-094613 points out that the transfer efficiency is deteriorated in the above condition.

Furthermore, in a case where the data analyzer cannot read the data because it becomes busy due to some reason, the buffer can no longer be used for receiving packet, and the data reception becomes disabled.

SUMMARY OF THE INVENTION

Accordingly, the present invention is conceived as a response to the above-described disadvantages of the conventional art.

For example, a printing apparatus and reception buffer management method according to the present invention are capable of maintaining an optimal transfer rate with an external device by appropriately managing a buffer.

According to one aspect of the present invention, preferably, there is provided a printing apparatus which can perform printing on a print medium by using data received in unit of packet via a wireless interface from an external device, comprising: reception means for receiving the data in unit of packet from the external device; a plurality of reception buffers which temporarily store the data received by the reception means; confirmation means for confirming a number of empty reception buffers of the plurality of reception buffers; determination means for determining a receivable data amount used for receiving the data from the external device on the basis of the number of the empty reception buffers confirmed by the confirmation means; first comparison means for comparing a transmittable data amount notified of the external device and the receivable data amount; and reply means for replying to the external device to change the notified transmittable data amount in accordance with a comparison result obtained by the first comparison means upon receiving a request from the external device.

It is preferable that the apparatus further comprises: printing means for performing printing on the print medium by continuously reading the data stored in the plurality of reception buffers by DMA transfer and using the read data; and first releasing means for releasing the reception buffer from which the data has been completely read out by the printing means, as an empty reception buffer.

It is preferable that the apparatus further comprises: second comparison means for comparing the number of the empty reception buffers confirmed by the confirmation means with a predetermined value upon receiving the data by the reception means; packing means for packing the data stored in the plurality of reception buffers in one reception buffer until the one reception buffer becomes full, in accordance with a comparison result obtained by the second comparison means; and second releasing means for releasing, as an empty reception buffer, a reception buffer from which the data has been read out by a packing process performed by the packing means.

Preferably, a data packet received by the reception means may include a header portion, a data portion, and a footer portion. It is preferable in this case that, upon packing the data by the packing means, the header portion and the footer portion are removed from the data packet to pack only the data portion.

Preferably, for example, the wireless interface uses a Bluetooth interface.

Preferably, the external device includes a mobile phone, personal digital assistant, and laptop computer.

Preferably, the printing means includes an inkjet printhead which performs printing by discharging ink on the print medium.

According to another aspect of the present invention, preferably, there is provided a reception buffer management method of managing a plurality of reception buffers upon performing printing on a print medium while storing data received in unit of packet via a wireless interface from an external device in the plurality of reception buffer, comprising a confirmation step of confirming a number of empty reception buffer(s) of the plurality of reception buffers; a determination step of determining a receivable data amount used for receiving the data from the external device on the basis of the number of the empty reception buffer(s) confirmed at the confirmation step; a comparison step of comparing a transmittable data amount notified of the external device and the receivable data amount; and a reply step of replying to the external device to change the notified transmittable data amount in accordance with a comparison result obtained at the comparison step upon receiving a request from the external device.

In accordance with the invention as described above, upon storing data received in unit of packet via a wireless interface from an external device in a plurality of reception buffers, the printing apparatus determines a receivable data amount used for receiving the data from the external device on the basis of the confirmed number of the empty reception buffer(s), compares a transmittable data amount notified of the external device and the receivable data amount, and replies to the external device to change the notified transmittable data amount in accordance with the comparison result upon receiving a request from the external device.

The invention is particularly advantageous since it is possible to receive data on the basis of the actually receivable data amount.

Hence, the data can be received without reducing the throughput or exhausting a resource for receiving the data.

Even in a case where only a small amount of data is contained in one buffer, the buffer is not released due to some reasons such as the delay in printing, and the number of available reception buffers is reduced, the data of the plurality of reception buffers is packed into one reception buffer to create an empty reception buffer. This results in performing smooth receiving process, and maintaining a preferable transfer rate with the external device and the throughput.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 is a block diagram showing the control configuration of the printer 800 shown in FIGS. 1 to 3;

DETAILED DESCRIPTION OF THE PREFERRED EMBODIMENT

A preferred embodiment of the present invention will now be described in detail in accordance with the accompanying drawings.

In this specification, the terms "print" and "printing" not only include the formation of significant information such as characters and graphics, but also broadly includes the formation of images, figures, patterns, and the like on a print medium, or the processing of the medium, regardless of whether they are significant or insignificant and whether they are so visualized as to be visually perceivable by humans.

Also, the term "print medium" not only includes a paper sheet used in common printing apparatuses, but also broadly includes materials, such as cloth, a plastic film, a metal plate, glass, ceramics, wood, and leather, capable of accepting ink.

Furthermore, the term "ink" (to be also referred to as a "liquid" hereinafter) should be extensively interpreted similar to the definition of "print" described above. That is, "ink" includes a liquid which, when applied onto a print medium, can form images, figures, patterns, and the like, can process the print medium, and can process ink (e.g., can solidify or insolubilize a coloring agent contained in ink applied to the print medium).

Furthermore, unless otherwise stated, the term "nozzle" generally means a set of a discharge orifice, a liquid channel connected to the orifice and an element to generate energy utilized for ink discharge.

Figure 1:
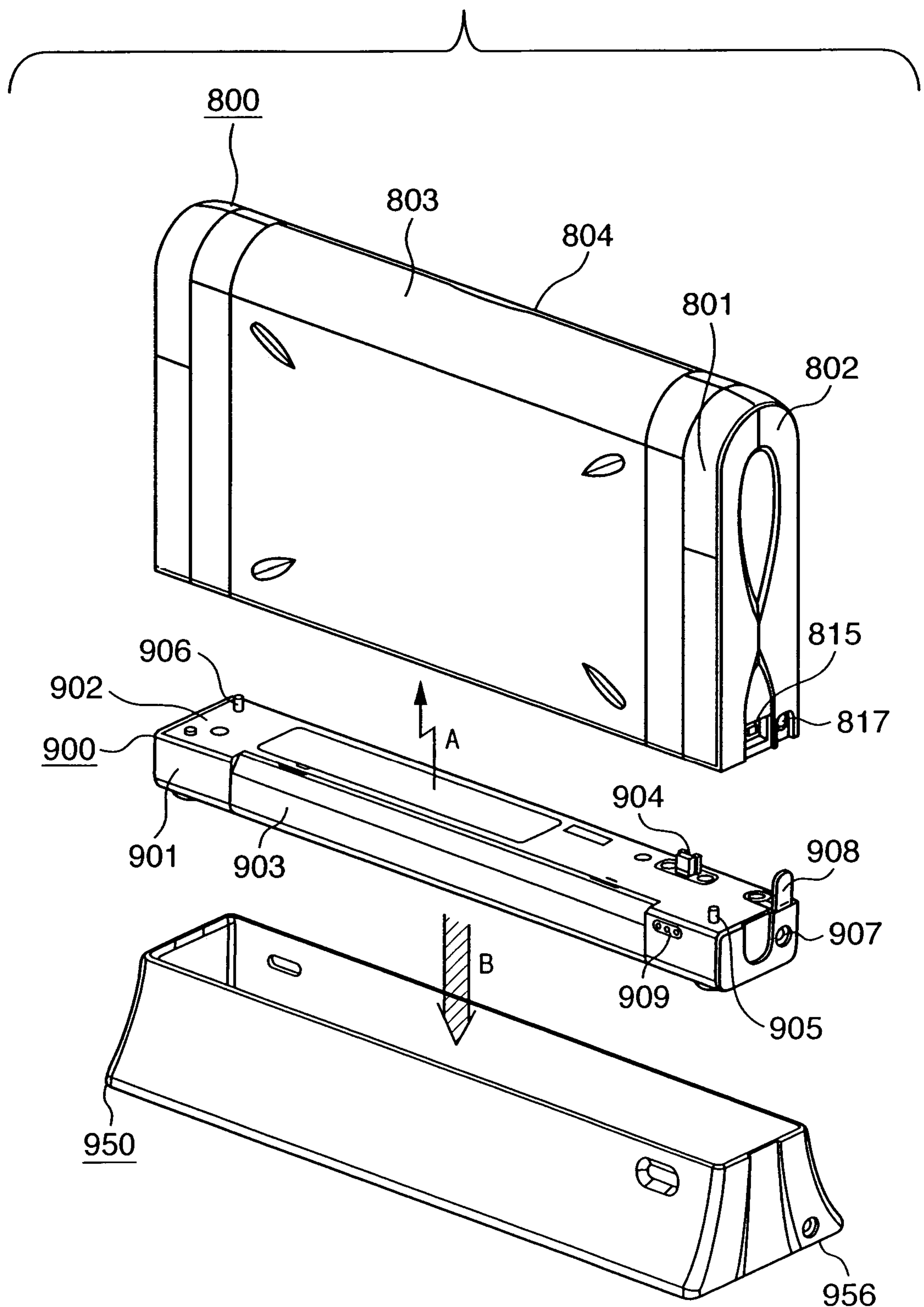
FIG. 1 is a perspective view showing the outer appearance of the overall arrangement of an inkjet printing apparatus according to a typical embodiment of the present invention.
Figure 2:
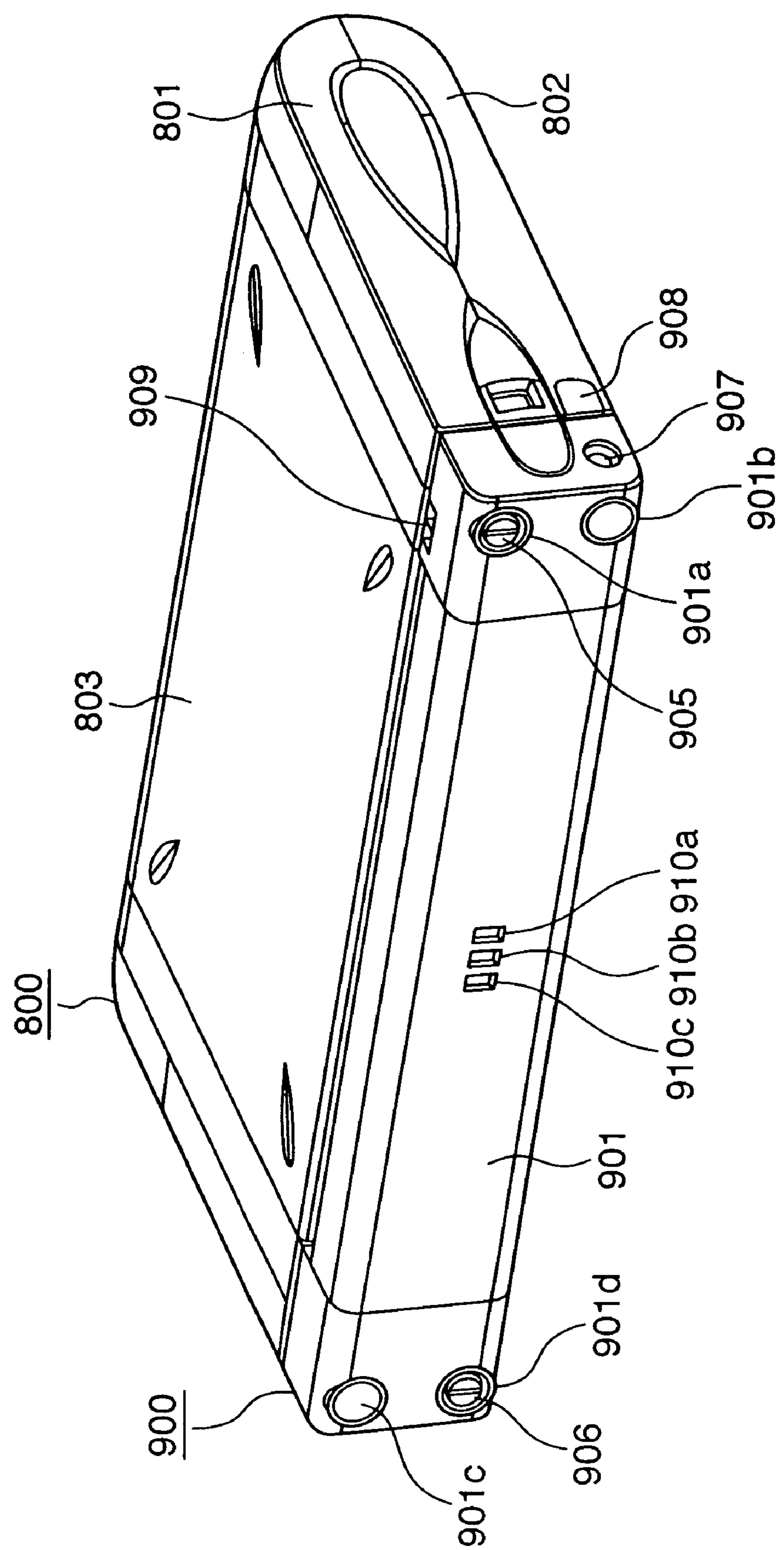
FIG. 2 is a perspective view showing a state in which a battery charger is mounted on the inkjet printer shown in FIG. 1.
Figure 3:
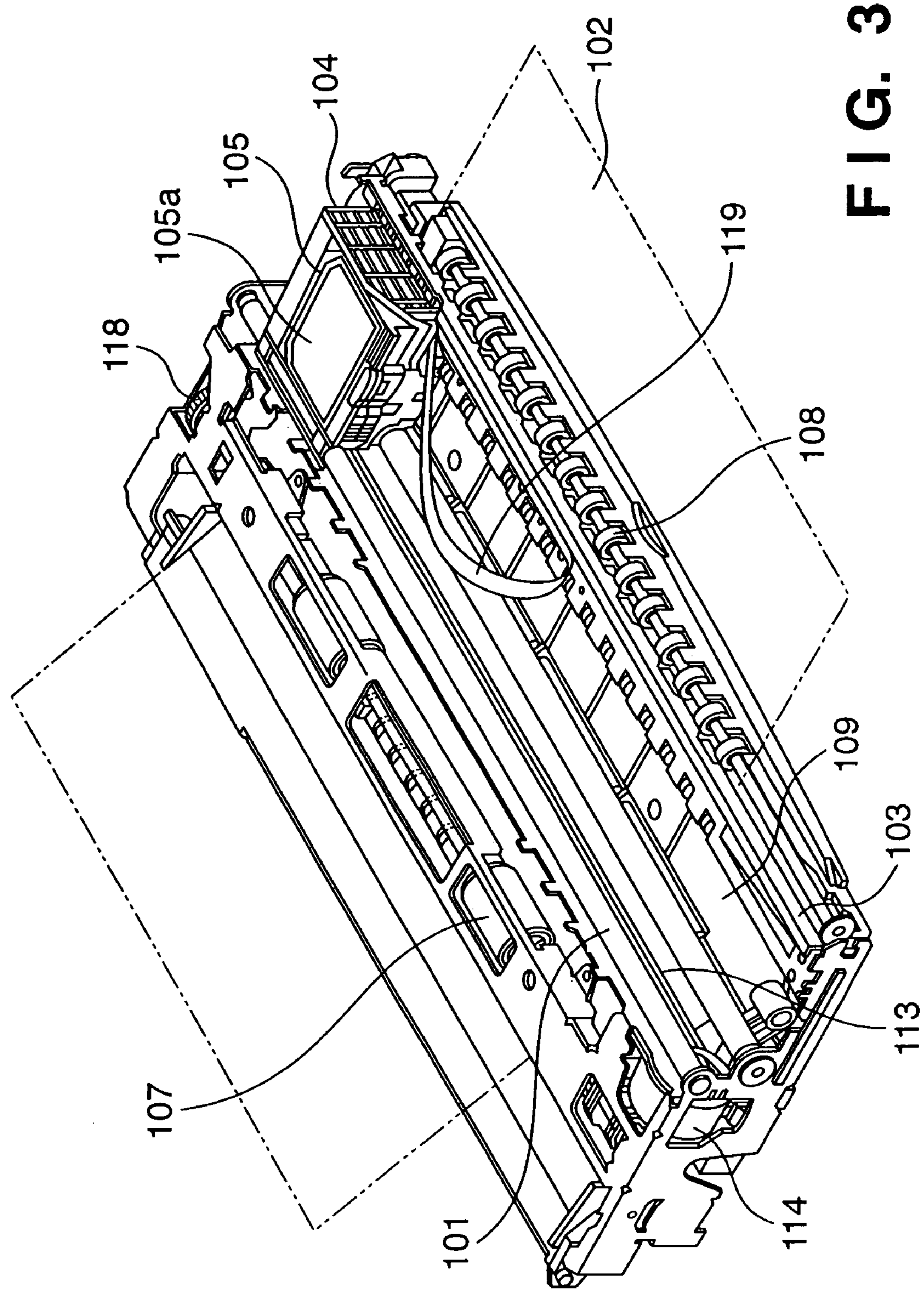
FIG. 3 is a perspective view showing the internal arrangement of a printer 800.

Description of Inkjet Printing Apparatus (FIGS. 1 to 3)

FIG. 1 is a perspective view showing the overall arrangement of an inkjet printing apparatus (hereinafter referred to as "printing apparatus") operable with both AC and DC power sources according to a typical embodiment of the present invention.

As shown in FIG. 1, the printing apparatus includes an inkjet printer 800 (referred to as "printer"), a battery charger 900 which incorporates a battery and is detachable from the printer main body, and a cradle 950 serving as a mount for vertically housing the printer and battery charger while attaching them. A paper sheet will be exemplified as a printing medium for printing by the printer. The present invention is not limited to this, and can be applied to any printable sheet-like medium.

In FIG. 1, the outer appearance of the printer 800 is an integral shell structure comprised of an upper case 801, lower case 802, feed cover 803, and discharge port cover 804. The printer 800 takes this form when it is not used (stands still or is carried). The side surface of the printer 800 has a "DC in" jack (DC power input jack) 817 for inserting an AC adapter cable (not shown) used when power is supplied from an AC power source, and an I/F (interface) connector 815 for connecting a USB cable. The feed cover 803 functions as a printing sheet supply tray which is opened from the printer main body to support a printing sheet such as a paper sheet in printing.

The outer appearance of a battery charger 900 is comprised of a main case 901, cover case 902, and battery lid 903. The battery lid 903 is detached to open the main case 901, allowing removing a battery pack integrating a battery.

The mounting surface (connection surface) of the battery charger 900 to the printer 800 has a main body connector 904 for electrical connection, and fixing screws 905 and 906 for mechanical attachment and fixing. The battery charger 900 is connected to the printer main body in a direction indicated by an arrow A in FIG. 1 to drive the printer 800 by the battery. The top surface of the battery charger 900 has a charge indicator 909 which indicates the residual capacity of the battery. The side surface of the battery charger 900 has a "CHG-DC in" jack 907 for inserting the AC adapter cable, and a cover plate 908 for covering the "DC in" jack 817 of the printer 800 when the battery charger 900 is attached.

A cradle 950 functions as a mount by inserting the printer 800 in a direction indicated by an arrow B in FIG. 1 while the battery charger 900 is attached to the printer 800. Note that the cradle 950 has an opening 950 so that the printer 800 can be charged by inserting the AC adapter cable into "CHG-DC in" jack 907 even when the battery charger 900 and the printer 800 are attached to the cradle 950.

FIG. 2 is a perspective view showing a state in which the battery charger 900 is mounted on the printer 800 when the printer back surface and printer top surface are viewed diagonally from the top.

As shown in FIG. 2, the battery charger 900 is attached to the back surface of the printer 800, and fixed with the fixing screws 905 and 906 so that the printer 800 becomes a battery-driven printer.

As described above, the "DC in" jack 817 of the printer 800 is covered with the cover plate 908 of the battery charger 900. In attaching the battery charger 900, a user reliably inserts the AC adapter cable to the "CHG-DC in" jack 907 of the battery charger 900, thus preventing erroneous insertion.

The back surface of the battery charger 900 has four legs 901*a*, 901*b*, 901*c*, and 901*d* on the main case 901. This back surface also has contacts 910*a*, 910*b*, and 910*c* for electrical contact upon attachment to the cradle 950.

As shown in FIG. 2, the charge indicator 909 of the battery charger 900 is arranged at a position where, even when the feed cover 803 is opened, the feed cover 803 does not interrupt visual recognition on the top surface on which the charge indicator 909 can be easily visually recognized in mounting or using the printer 800.

FIG. 3 is a perspective view showing the internal structure of the printer 800.

As shown in FIG. 3, a printhead 105, mounted on a carriage 104, is reciprocated in a lengthwise direction along a guide rail 103. Ink discharged from the printhead 105 is attached to a printing medium 102 where its printing surface is regulated on a platen (not shown) with a slight interval from the printhead 105, and forms an image on the print medium.

The printhead 105 is supplied with a print signal via a flexible cable 119 in correspondence with image data.

Note that in FIG. 3, numeral 114 denotes a carriage motor to scan-move the carriage 104 along the guide rail 103. Numeral 113 denotes a carriage belt to transmit a driving force of the carriage motor 114 to the carriage 104. Further, numeral 118 denotes a conveyance motor connected to a conveyance roller 101 to convey the printing medium 102.

Further, the printhead 105, connected to an ink tank 105*a*, constructs a head cartridge. As the structure of the head cartridge, the printhead and the ink tank may be separable from each other or may be integral with each other.

Further, numeral 107 denotes a pickup roller to pickup the printing medium 102 upon paper feed and guide the printing medium into the apparatus. Numeral 108 denotes a paper discharge roller to discharge the printing medium 102 to the outside of the apparatus upon paper discharge.

In the printing apparatus according to this embodiment, the user can select his/her desired paper sheet from a plurality of sizes of paper sheets to perform printing. The sizes include a name card, personal organizer mini, personal organizer bible, A5, and A4 sizes.

Almost all the above mechanical parts are attached to a base chassis 109 of the apparatus.

Control Configuration of Inkjet Printing Apparatus (FIG. 4)

FIG. 4 is a block diagram showing a control construction of the printer 800 shown in FIGS. 1 to 3.

As shown in FIG. 4, a controller 600 has an MPU 601, a ROM 602 holding a program corresponding to a control sequence to be described later, a required table, and other fixed data, an Application Specific Integrated Circuit (ASIC) 603 to generate control signals for controlling the carriage motor 114, the conveyance motor 118 and a printhead 105, a RAM 604 which stores various variables and a control table, and has an image data mapping area, and a work area for execution of program a print buffer, and the like, a system bus 605 interconnecting the MPU 601, the ASIC 603 and the RAM 604 for data transmission/reception, an A/D converter 606 to input analog signals from a sensor group to be described later and A/D convert the signals and supply digital signals to the MPU 601, and the like.

Further, in FIG. 4, numeral 610 denotes a host device such as a desktop computer (or an image reader, digital camera, mobile phone, personal digital assistant (PDA), laptop computer, or the like) serving as an image data supply source. Image data, commands, status signals and the like are transmitted/received between the host device 610 and the printing apparatus via an interface (I/F) 611.

Further, numeral 620 denotes a switch group including switches for receiving instruction inputs from an operator such as a power source switch 621, a print switch 622 for print start instruction, and a recovery switch 623 for instruction of start of processing (recovery processing) to maintain ink discharge performance of the printhead 105 in excellent status. Numeral 630 denotes a sensor group for detection of apparatus status including a position sensor 631 such as a photo coupler for home position detection, a temperature sensor 632 provided in an arbitrary position of the printing apparatus for detection of environmental temperature, and the like.

Further, numeral 640 denotes a carriage motor driver which drives the carriage motor 114 to reciprocate-scan the carriage 104 along the guide rail 103. Numeral 642 denotes a conveyance motor driver which drives the conveyance motor 118 to convey the printing medium 102.

Upon print scanning by the printhead 105, the ASIC 603 transfers drive data (DATA) for printing elements (discharge heaters) to the printhead while directly accessing the storage area of the RAM 602.

Note that the printhead 105 includes a head temperature sensor 105*b* for measurement of head temperature.

Further, the printer 800 is provided with a timer 607 which can operate with electric power supply from a small battery (a lithium battery, a nickel hydride battery, an alkali button battery, a silver oxide battery, a zinc-air battery or the like) 608 so that the timer can still continue its clocking operation even when electric power supply from the AC and DC power sources is stopped. Time counted by the timer 607 is stored in a nonvolatile memory 609 such as an EEPROM. Note that as the nonvolatile memory, an FeRAM, an MRAM and the like may be used in addition to the EEPROM.

Since this printing apparatus can use both the AC and DC power supplies, the printing apparatus can maintain the operation upon supplying the power from the DC (battery) even when the AC adapter is pulled out while the printing apparatus operates by supplying the AC power from an AC adapter (not shown). Therefore, this printing apparatus includes a mechanism for determining whether this printing apparatus is driven by the AC adapter or the battery. Since this mechanism is well-known, a detailed description thereof will be omitted.

Furthermore, the interface (I/F) 611 of this printing apparatus includes a wired interface such as USB, and a wireless interface such as IEEE802.11x, IrDA, or Bluetooth.

In this embodiment, Bluetooth is used as the wireless interface.

Figure 5:
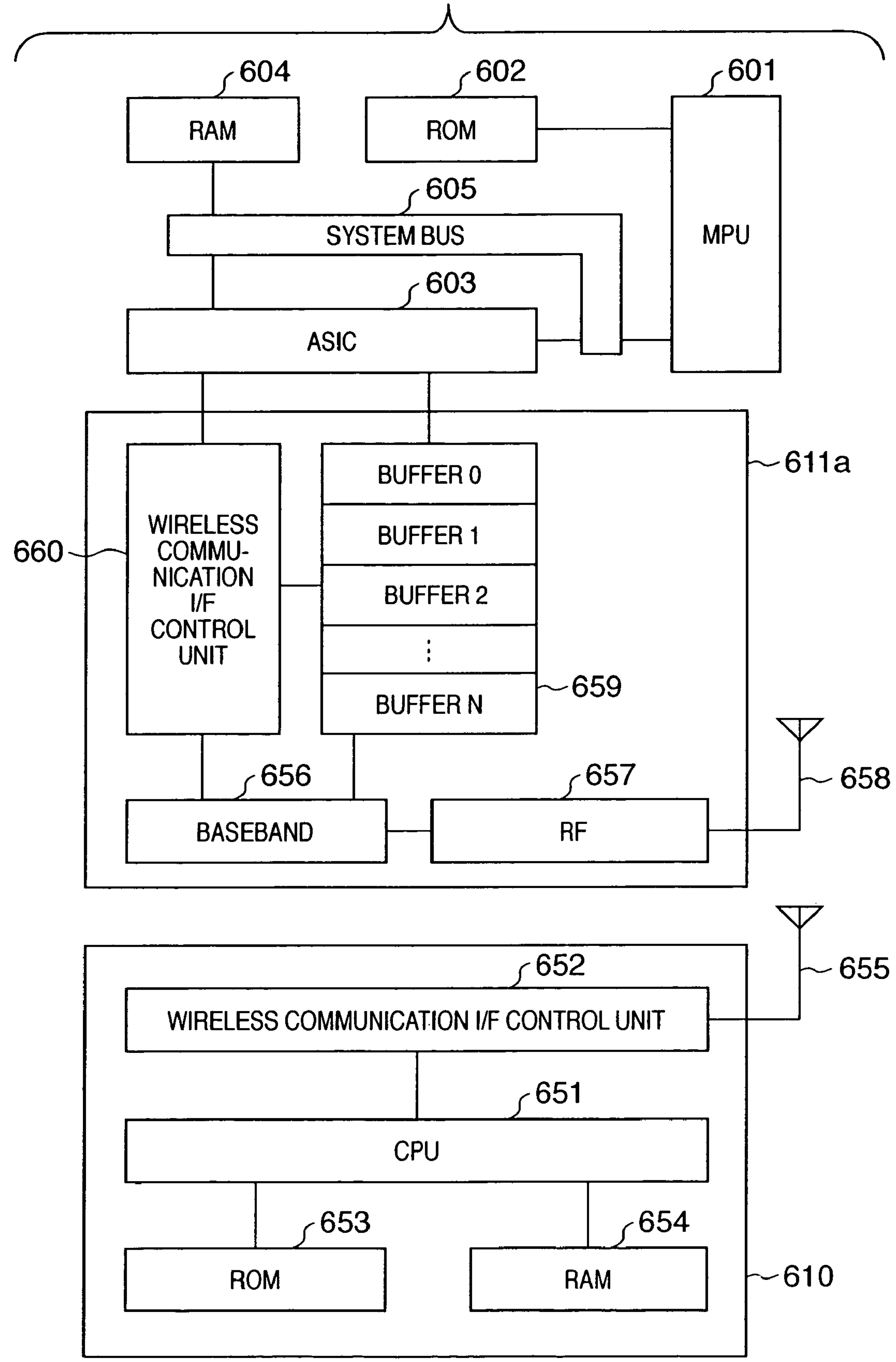
FIG. 5 is a block diagram showing the detailed arrangement of a wireless interface, and the arrangement of the peripheral portion.

FIG. 5 is a block diagram showing the detailed arrangement of the wireless interface, and the arrangement of its peripheral portion.

As shown in FIG. 5, a wireless interface 611*a* in the interface 611 includes a baseband unit 656, RF (Radio Frequency) unit 657, antenna 658, transmission/reception buffer 659, and wireless communication I/F control unit 660.

The MPU 601, ROM 602, ASIC 603, and RAM 604 which are used for processing the data received by the wireless interface 611*a* to perform printing are arranged as described above. Note that in place of or in addition to the ROM 602 and EEPROM 609, a flash ROM can also be used. In the arrangement shown in FIG. 5, the transmission/reception buffer 659 and the RAM 604 are separated from each other. However, the transmission/reception buffer 659 which includes a plurality of buffers (buffer 0, 1, 2, . . . , N) for receiving the packets can also be implemented by using a part of the RAM 604. The RAM 604 includes a reception FIFO (to be described later). This reception FIFO stores a buffer number (address) and a data amount (e.g., byte count) stored in the buffer. These are used for DMA transfer (to be described later).

The host device 610 serving as a communication partner which transmits the data to the printing apparatus by communicating by using the Bluetooth wireless interface also includes a CPU 651, wireless communication I/F control unit 652, ROM 653, RAM 654, and antenna 655. The host device 610 transmits various printing data and control data to the printing apparatus via the wireless communication I/F control unit 652 using the Bluetooth wireless interface.

The signal received from the host device 610 via the antenna 658 is demodulated by the RF unit 657, and the demodulated data is output to the baseband unit 656. The baseband unit 656 performs error correction of the demodulated data. In accordance with the process result, the normally received data is stored in the transmission/reception buffer 659 using DMA transfer. On the other hand, the baseband unit 656 issues a retransmission request for error-detected data. Also, the wireless communication I/F control unit 660 issues an authentication request to the partner device, and performs an encryption process, according to a security mode setting.

Between the baseband unit 656 and the wireless communication I/F control unit 660, various control processes, event processes, and data communications are performed via the transmission/reception buffer 659 in unit of packet in accordance with the host control interface (to be referred to as an HCI hereinafter) defined by the standardized specification.

The wireless communication I/F control unit 660 analyzes the packet data stored in the transmission/reception buffer 659 to which the baseband unit 656 output, and performs the control processes on link connection negotiation, service searching response, connection negotiation in each protocol layer, data transfer, flow control, and the like.

The HCI data transmitted from the wireless communication I/F control unit 660 is stored in the transmission/reception buffer 659. The wireless communication I/F control unit 660 adds the error correction code and the like to the output data. The output data is converted to data having a predetermined data format, and the converted data is output to the RF unit 657. The RF unit 657 modulates the output data, and transmits the modulated output data to another wireless communication device such as the host device 610 or the like by using the antenna 658.

The wireless communication I/F control unit 660 removes a header and footer of each packet of the printing data transmitted from the host device 610 stored in the transmission/reception buffer 659, and then these data are DMA-transferred in unit of buffer. Therefore, when receiving the packet, the printing data is queued at the end of the reception FIFO as the DMA-transfer reservation.

In this embodiment, in a case where the ASIC 603 uses the reception data, DMA-transfer is performed under the control of the MPU 601, and the ASIC 603 is capable of continuously DMA-receive the data in a queuing order in the reception FIFO. The buffer having undergone the DMA transfer becomes available again as an empty buffer for storing data. The printing data and the like DMA-transferred to the ASIC 603 are analyzed by the MPU 601 by executing a control program stored in the ROM 603. The printing data and the like are converted into the control signal and printing signal on the basis of the analysis result, or the control signal and printing signal are generated from the printing data and the like on the basis of the analysis result. Such conversion or generation is performed in a signal generation unit and conversion unit provided in the ASIC 103. Finally, these signals are output to the printhead 105 to perform printing.

The printing process from the host device 610 with the Bluetooth interface to the printer 800 performed in accordance with an HCRP will be described in detail below with reference to the timing chart in FIG. 6.

Figure 6:
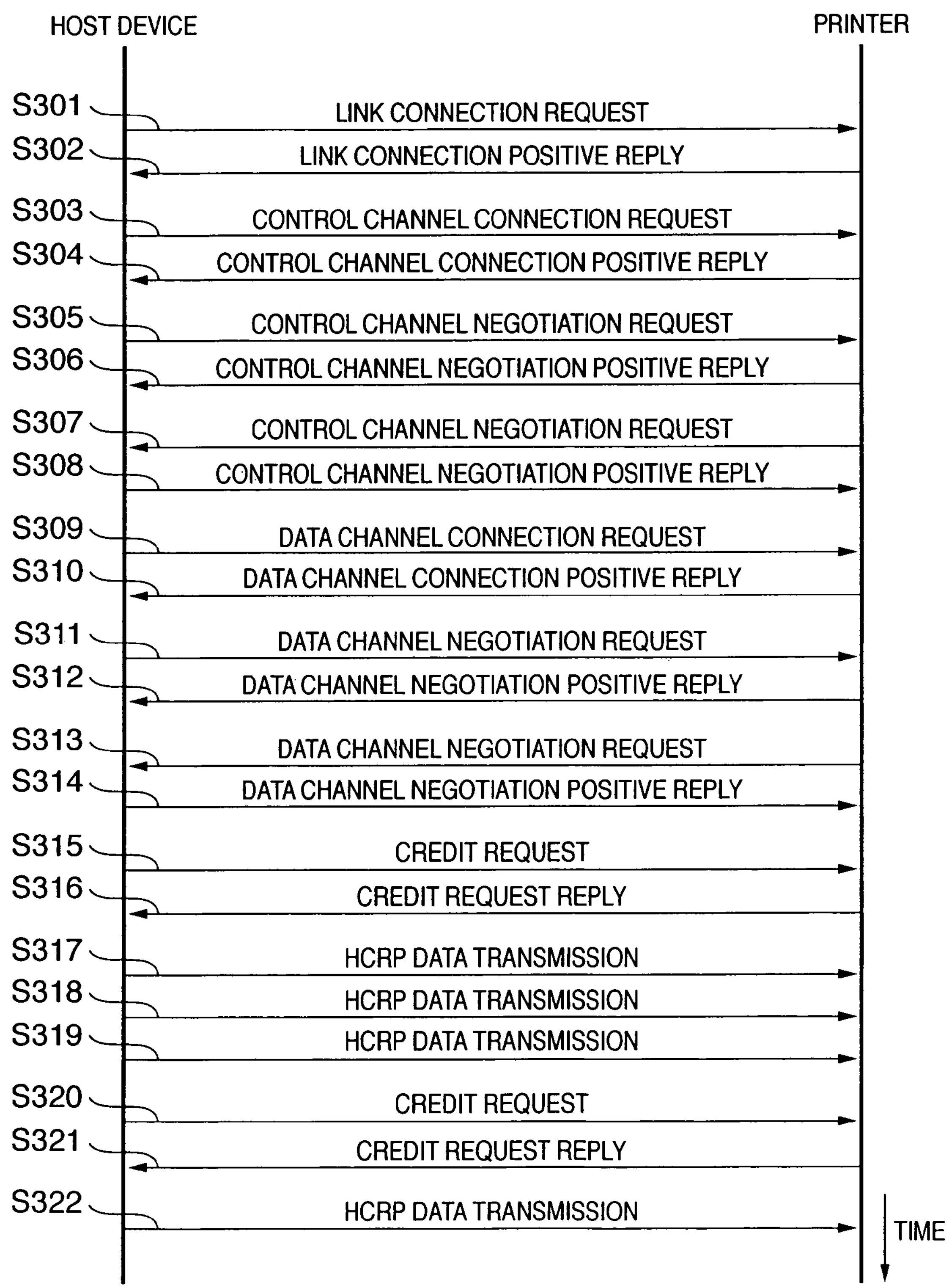
FIG. 6 is a timing chart showing a communication sequence between a host unit and the printer.

FIG. 6 is a timing chart showing a communication sequence between the host device and the printer.

When issuing the printing instruction from the host device by a user operation and the like, the host device requests a link connection to the printer (S301). Since the printer positively replies to the link connection request, the link connection is established (S302).

The host device requests the HCRP control channel connection in the L2CAP layer (S303). When the printer side returns the positive reply (S304), the control channel connection is established. The host device and the printer must negotiate about each of the connections in the L2CAP layer. Hence, they negotiate with each other about a parameter transferred via the control channel. In this negotiation parameter, the host device itself can negotiate about an MTU value which represents the maximum receivable number of data as one packet.

First, the host device issues the negotiation request for the control channel (S305). When the printer positively replies to this negotiation request, the negotiation on the host device side completes (S306). Likely, the printer issues the negotiation request in order to negotiate about its own parameter (S307). When the host device positively replies to this negotiation request, the negotiation is complete (S308). The host device and the printer also issue the connection requests and negotiation requests about the data channel (S309 to S314) to complete the negotiation about the parameter of the data channel.

When negotiating about the channel, the printer in this embodiment uses a value obtained by subtracting the size of the header from the size of the transmission/reception buffer 659 which corresponds to a maximum receivable number of data in one packet for the MTU value. Hence, the host device can transmit each packet whose amount is up to a single buffer size.

Note that in this embodiment, the connection and flow sequence of the connection and negotiation in the L2CAP layer is merely illustrative. However, the flow sequence may be changed as far as the negotiation is performed after connecting the channel, and the response to the request is normally performed.

Next, the host device requests a transmittable credit value to the printer using the control channel (S315). In response to the request, the printer returns the credit indicating a receivable byte count (S316). The credit value will be described in detail below. Upon receiving this credit, the host device transmits the HCRP data via the data channel (S317 to S319).

The number of data to be transmitted at a time cannot exceed the MTU value determined by the negotiation, and the total data count to be transmitted during this period of time cannot exceed the given credit count. Therefore, the host device must subtract the data count transmitted from the given credit. The host device can always issue a credit request to the printer. However, the printer may return a credit value of "0" if the printer has no available credit.

At the timing when the host device has no credit, or at a constant timing, the host device requests a credit again (S320). In response to this request, the printer returns a currently available credit count. The host device adds the transmitted credit, and transmits the resultant transmittable data count (S322).

According to this flow sequence, the printing data according to the HCRP is transmitted to the printer so as not to exceed the credit value transmitted from the printer side, and printing is performed.

Next, the buffer transfer reservation process on the printer side will be described with reference to FIGS. 7A to 7C.

Figure 7A:
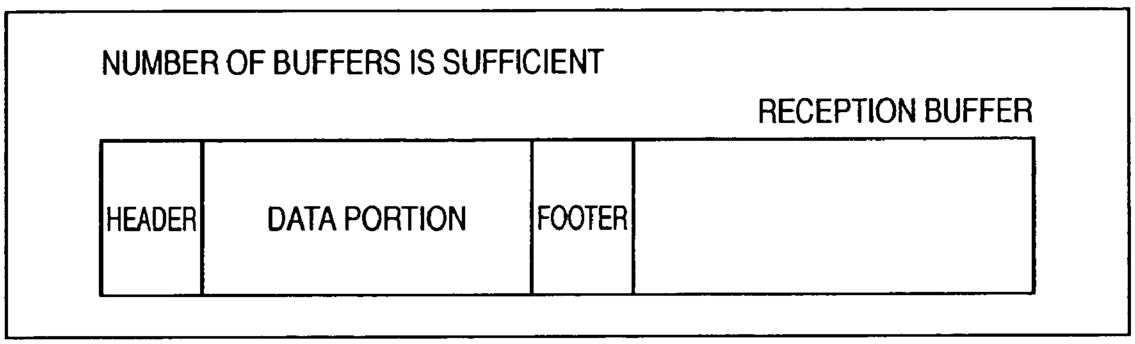
FIGS. 7A, 7B, and 7C are views showing states in which the reception data is stored in a buffer.
Figure 7B:
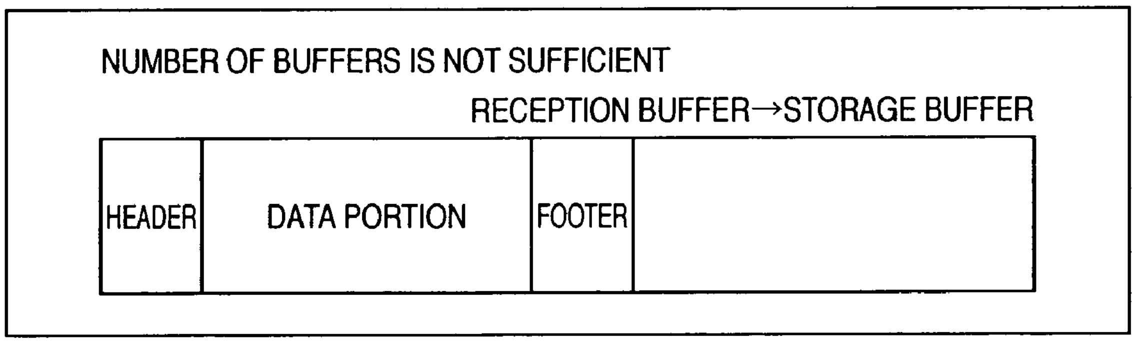
Figure 7C:
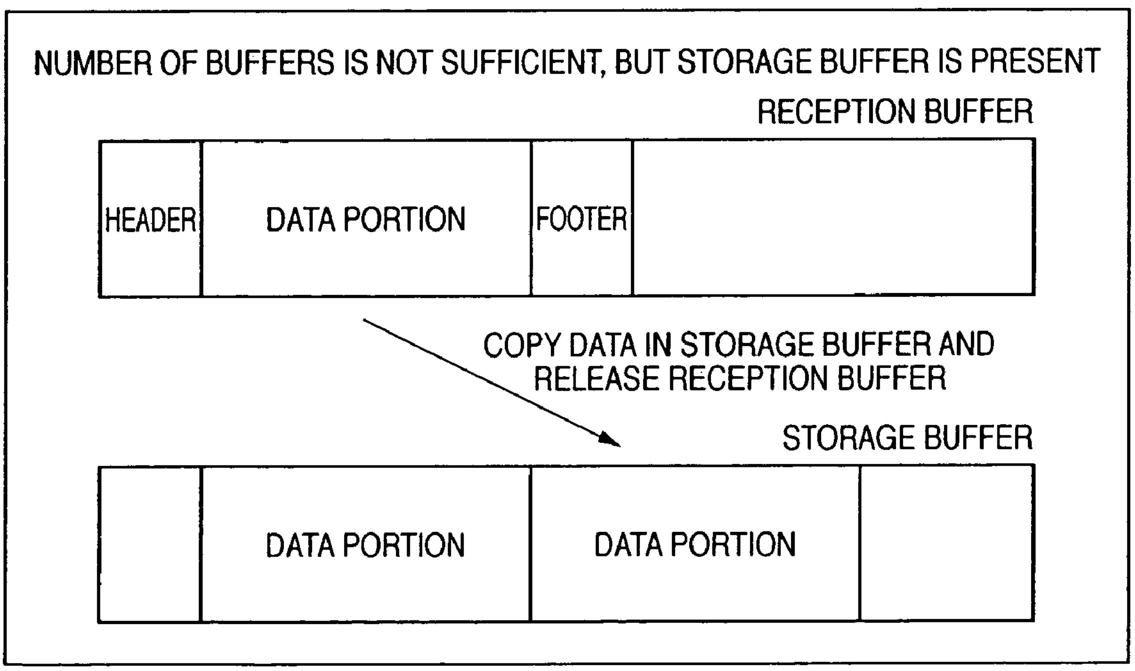

FIGS. 7A to 7C are views showing a state in which the reception data is stored in a buffer.

As shown in FIG. 5, the transmission/reception buffer 659 has (N+1) buffers. When receiving data of one packet, the printer 800 confirms the number of the remaining buffers. If the printer 800 confirms the presence of more than a certain amount of remaining buffers, as shown in FIG. 7A, the data amount of one packet stored in the reception buffer is examined to transfer-reserve in the reception FIFO. This reception buffer is not released till completely reading the data from the ASIC 603 side. However, since the data read-out is usually completed within a short period of time, the buffer is immediately released.

When the printer side becomes "stand by" status for the print buffer due to error status (for example no paper condition or the like), the MPU 601 cannot continue data analysis process and cannot activate DMA-transfer for reading the data from the transmission/reception buffer. Hence, many data are queued up in the reception FIFO, and the number of the remaining transmission/reception buffers becomes lesser and lesser. As described above, in a case where data reception is performed using a smaller number of buffers than a predetermined value, and the allowable amount of the reception buffer cannot satisfy the reception data amount, as shown in FIG. 7B, the transmission/reception buffer (reception buffer in this case since the data reception is under consideration) is not immediately transfer-reserved, and the reception data is stored in the transmission/reception buffer as a storage buffer.

In a case where the reception buffer is not released, and the next packet is received, as shown in FIG. 7C, the header and footer are removed from the received data, the only data portion is added and stored into the storage buffer to release the reception buffer. Until the reception buffer is released, or until the storage buffer becomes full, the data portion of the subsequently transmitted packet is sequentially stored.

With this operation, the released reception buffer can be reused. When the reception data amount reaches the allowable amount of the storage buffer at the timing of adding the data portion to the storage buffer, the data stored in the storage buffer is queued to the reception FIFO. Furthermore, when remaining data is still present, the remaining data is stored in the reception buffer as a new storage buffer.

As the DMA transfer is restarted by error recovery, and the data in the reception buffer/storage buffer registered in the reception FIFO is transferred, the number of the remaining reception buffers increases. Note that since the data is transferred in a queuing (registration) order in the reception FIFO regardless of whether the data is stored in the reception buffer or the storage buffer, the sequence of the data reception can be maintained.

With reference to the flowchart shown in FIG. 8, the packet data reception process in the printer 800 will be described below. In this description, assume that thirty-one 2000-byte buffers are present as the reception buffers. Note that the transmission/reception buffer 659 is used in this reception process. However, since this process is a packet reception process, the transmission/reception buffer 659 is referred to as a reception buffer hereinafter.

Figure 8:
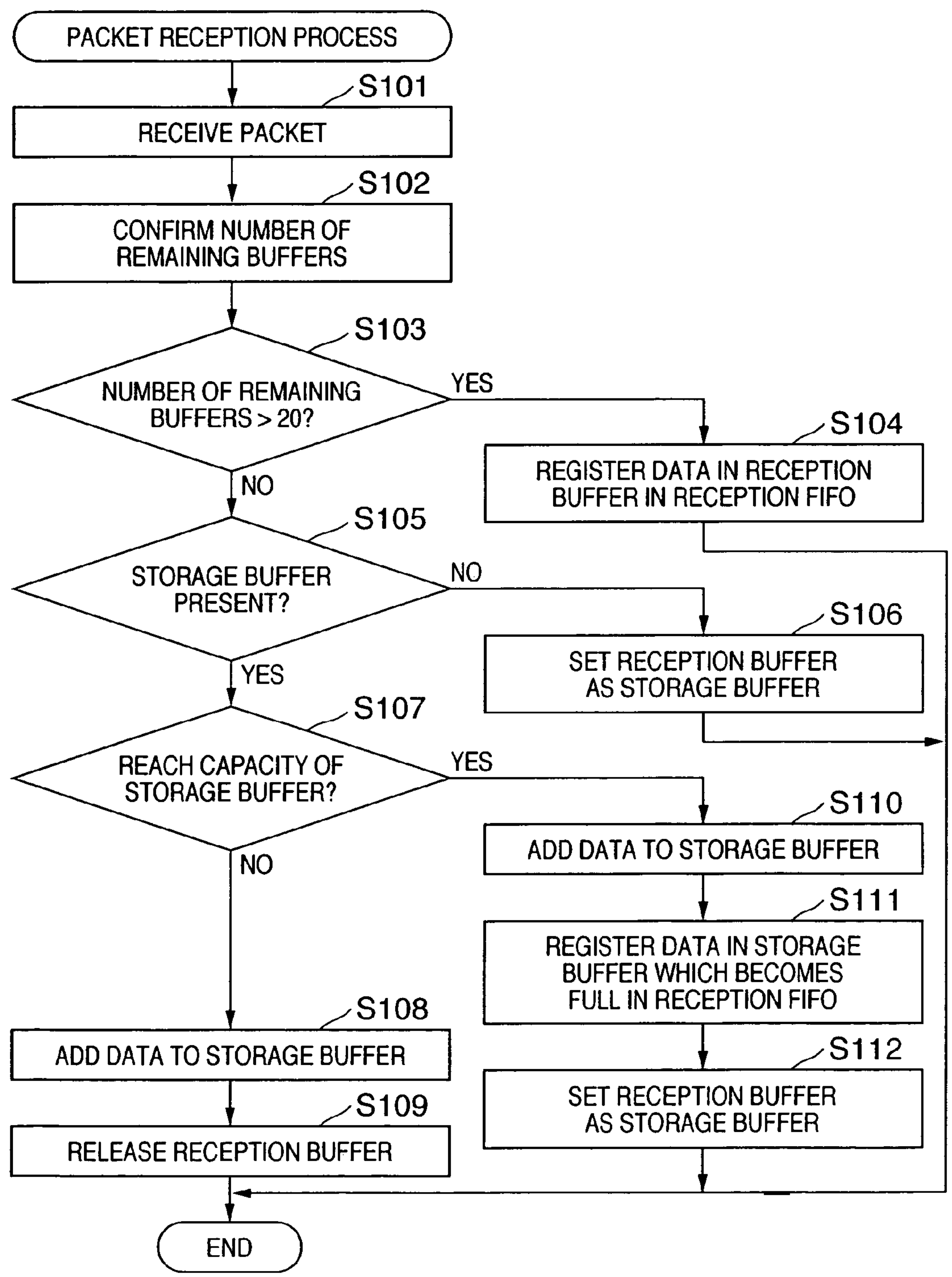
FIG. 8 is a flowchart showing a packet data reception process.

FIG. 8 is a flowchart showing a packet data reception process. This process is executed for each packet reception.

In step S101, the printer 800 receives packet data, and stores it in the reception buffer. The number of the remaining reception buffers is confirmed in step S102. In step S103, it is determined whether the number of the remaining buffers is larger than the sufficient value (in this case, this value is 20).

When the number of the remaining buffers is equal to or more than 20, and it is determined that the number of the reception buffers is sufficient, the flow advances to step S104, the data in the reception buffer is registered in the reception FIFO, and then the process ends.

Alternatively, when the number of the remaining buffers is less than 20, and it is determined that the number of the reception buffers is insufficient, the flow advances to step S105 to determine whether or not there is a storage buffer.

When it is determined that the storage buffer exists, the flow advances to step S107. Alternatively, when it is determined that the storage buffer does not exists, the flow advances to step S106. In step S106, the reception buffer is set as the storage buffer. The storage buffer stores the packet data, and then the process ends.

In step S107, it is checked whether or not the sum (DTOTAL) of the currently received data amount and the data amount stored in the storage buffer reaches the capacity of the storage buffer, i.e., 2000 bytes. In other words, it is determined whether or not all the data in the reception buffer to be stored can be stored in the presently empty area of the storage buffer.

When DTOTAL>2000 bytes (when it is determined that all of the data cannot be stored), the flow advances to step S110, and the data of the reception buffer is packed into the storage buffer until the total data amount reaches the maximum capacity of the storage buffer. In the next step S111, the data of the storage buffer is registered in the reception FIFO. Also, in step S112, the reception buffer is set as a storage buffer to store the data, and then the process ends. That is, when the data cannot be stored in the present storage buffer, a reception buffer is set as a new storage buffer, and the unstored data is stored in the new storage buffer.

On the other hand, when DTOTAL≦2000 bytes (when it is determined that all of the data can be stored), the flow advances to step S108. The reception data is added to the storage buffer, and the reception buffer is released in step S109, and then the process ends.

With this operation, when the DMA transfer of the data is suspended, and the number of remaining buffers decreases, the reception buffer is effectively utilized by packing data into the storage buffer up to its maximum capacity without wasting packets of the reception buffer. In this illustrative example, when the number of the remaining buffers is 30 to 20 (the number of the remaining buffers cannot be 31 because of the received buffer itself), the data of the reception packet is transfer-reserved without any other process. Generally, when the MPU 601 normally analyzes the received printing data, the DMA transfer is always performed. Hence, the reception buffer is immediately released, and the transfer using up to 10 reception buffers can reduce the influence on the throughput.

With reference to the flowchart shown in FIG. 9, the management process of a credit transmitted from the printer 800 to the host device 610 will be described in detail. In this description, the host device 610 issues a credit request in the reception buffer having the same arrangement as that described in the packet data reception process.

Figure 9:
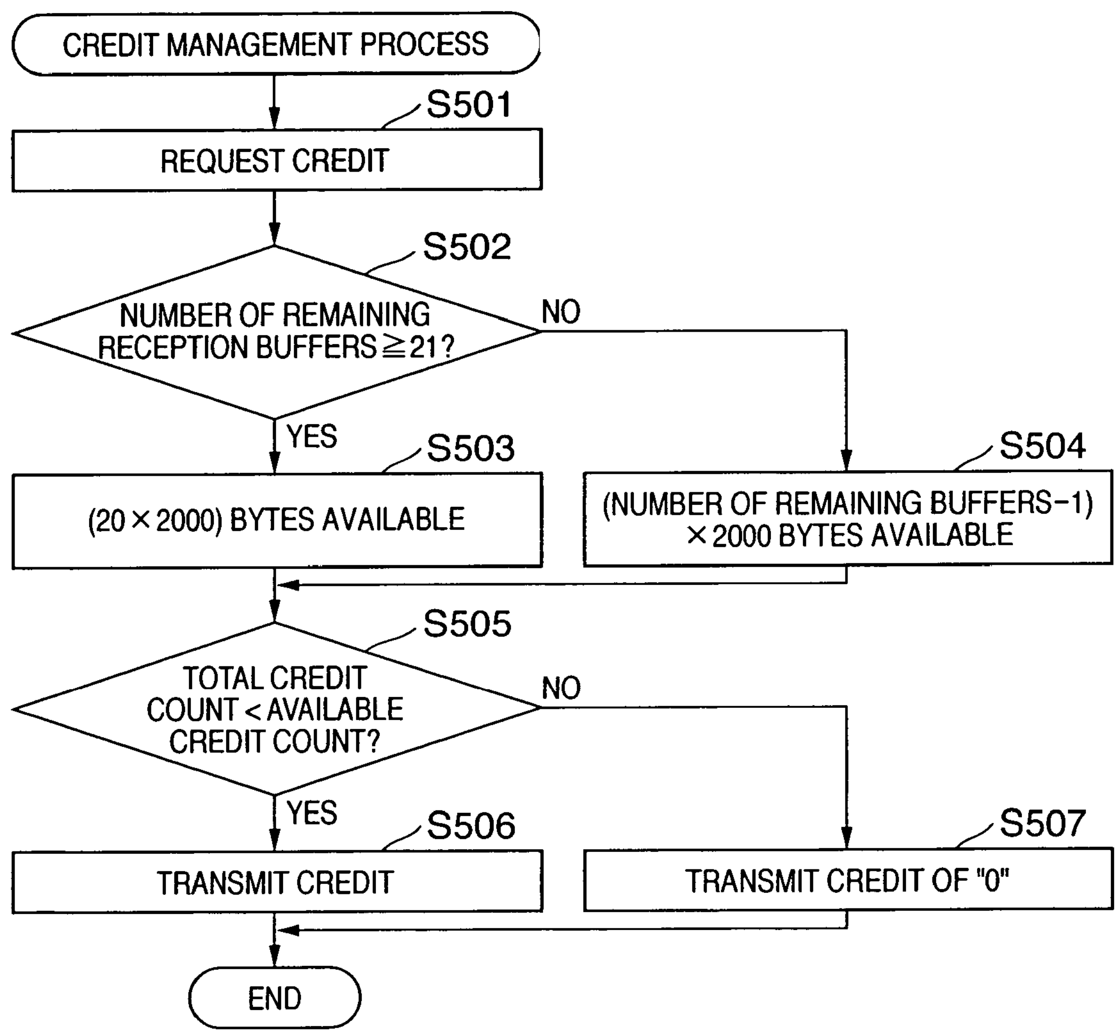
FIG. 9 is a flowchart showing a credit management process.

FIG. 9 is a flowchart showing a credit management process.

When a credit request is issued in step S501, the number of the remaining reception buffers is confirmed in step S502.

When the number of the remaining reception buffers is 21 or more (i.e., 30 ≧number of remaining reception buffers ≧21), the flow advances to step S503. A 40000 (=20×2000)-byte credit which is the maximum credit of 20 buffers becomes available. When the number of the remaining credits changes within the above range, since the host device 610 can always transmit data up to 40000-byte, the throughput is maintained.

On the other hand, when it is determined that the number of the remaining reception buffer is 20 or less, the flow advances to step S504. Since data is packed into one buffer up to its maximum capacity, a {(number of reception buffer−1)×2000}-byte credit obtained by subtracting the number (i.e., at least one) of the storage buffers from the number of the reception buffers becomes available. Even when the host device 610 transfers data using a packet having a shorter data length while the MPU 601 does not activate the DMA data transfer, since the data is packed in the storage buffer, and the packed data is transferred upon receiving the data according to the above-described process, the reception buffer is available as far as the data count does not exceed the credit count.

Actually, in consideration of the number of bytes contained in the 10 reception buffers having undergone the transfer reservation in the burst transfer, and the number of bytes stored in the storage buffer, a maximum receivable credit can be calculated. The number of bytes may be added to calculate the maximum credit.

The printer 800 manages the total credit count with respect to the host device 610 by subtracting the amount of received data from the currently given total credit count whenever receiving the data. In step S503 or S504, when the available total credit count is calculated, the flow advances to step S505. The total number of credits (CCRDT) currently given to the host device 610 is compared with the number of the available credits (AVCRDT).

When AVCRDT>CCRDT, the flow advances to step S506. The credit is transmitted, and then the process ends. On the other hand, when AVCRDT≦CCRDT, the credit cannot be transmitted. Hence, the flow advances to step S507 to reply the credit value of "0", and then the process ends.

Note that in the actual transmission/reception buffer management, in addition to the reception buffer, the transmission buffer, HCI command transmission buffer, and HCI event reception buffer are simultaneously managed. Hence, the transmission/reception buffer management is performed in consideration of the management of these buffers.

More specifically, the wireless communication I/F control unit 660 assigns a buffer used for storing transmission data or reception data from a unused buffer of the transmission/reception buffer 659. In a case where a buffer is assigned for receiving data, and the buffer is used for transmitting data after transferring the received data to the ASIC 603, the wireless communication I/F control unit 660 performs process for switching between a reception buffer and a transmission buffer.

Therefore, according to the above-described embodiment, when receiving packet data, the reception data is packed to temporarily store it in the storage buffer in accordance with the number of the remaining reception buffers. Hence, the reception data transfer can be controlled. With this operation, the reception buffer can be effectively used to contribute to always preparing the maximum numbers of buffers with respect to the reception process.

When the host issues a credit request, the maximum number of available credits can be determined in accordance with the number of the remaining reception buffers. Hence, in accordance with the determined number and the currently given number, the number of credits to be replied to the host device can be determined. With this operation, the maximum number of credits can be given from the printing apparatus side while ensuring the minimum number of reception buffers required for receiving data. Hence, the smooth communication can be implemented by using the Bluetooth wireless interface while maintaining an optimal transfer rate with the host.

Note that in the above embodiment, droplets discharged from the printhead are ink, and a liquid stored in the ink tank is ink. The content of the ink tank is not limited to ink. For example, the ink tank may contain processing liquid to be discharged onto a print medium in order to increase the fixing properties, water repellency, or quality of a printed image.

Of the inkjet printing methods, the above-described embodiment comprises a method in which means (e.g., electrothermal transducer) for generating heat energy utilized to discharge ink, thereby causing a state change of ink by the heat energy is provided. Hence, this inkjet printing method can attain high density and high resolution printing.

Furthermore, as a full line type printhead having a length corresponding to the width of a maximum printing medium which can be printed by the printer, either the arrangement which satisfies the full-line length by combining a plurality of printheads as disclosed in the above specification or the arrangement as a single printhead obtained by forming printheads integrally can be used.

In addition, not only a cartridge type printhead in which an ink tank (container) is integrally arranged on the printhead itself, as described in the above embodiment, but also an exchangeable chip type printhead which can be electrically connected to the apparatus main unit and can receive an ink from the apparatus main unit upon being mounted on the apparatus main unit can be applicable to the present invention. Note that the ink tank of the printhead cartridge may be filled or refilled with ink.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-021313 filed on Jan. 29, 2004, the entire contents of which are incorporated herein by reference.

What is claimed is:

1. A printing apparatus which can perform printing on a print medium by using data received in units of packets via a wirless interface from an external device, the printing apparatus comprising:

a reception means for receiving the data in units of packets from the external device, into a plurality of reception buffers which temporarily store the data received by said reception means;

a printing means for performing printing on the print medium, based on the data stored in said plurality of reception buffers; and a controller including:

a memory means for storing data to be printed by said printing means;

a DMA-transfer means for DMA (Direct Memory Access)-transferring the data stored in said plurality of reception buffers to said memory means according to a printing status of said printing apparatus so that said printing means prints based on the transferred data;

a confirmation means for confirming a number of empty reception buffers of said plurality of reception buffers;

a comparison means for comparing the number of the empty reception buffers confirmed by said confirmation means with a predetermined value upon receiving the data by said reception means;

a packing means for packing the data stored in said plurality of reception buffers in one reception buffer until the one reception buffer becomes full, in accordance with a comparison result obtained by said comparison means; and a releasing means for releasing, as an empty reception buffer, a reception buffer of said plurality of reception buffers, from which the data has been completely read out by a packing process perfomed by said packing means whereby the controller manages said reception buffers to optimize a rate of receiving the data by said printing apparatus.

2. The apparatus according to claim 1, wherein a data packet received by said reception means includes a header portion, a data portion, and a footer portion, and when said packing means packs the data, the header portion and the footer portion are removed from the data packet to pack only the data portion.

3. The apparatus according to claim 1, wherein the wireless interface includes a Bluetooth interface.

4. The apparatus according to claim 1, wherein said printing means includes an inkjet printhead which performs printing by discharging ink on the print medium.

5. The apparatus according to claim 1, wherein the external device includes a mobile phone, personal digital assistant, and laptop computer.

6. The apparatus according to claim 1, wherein when the apparatus recovers from the error, the DMA-transfer by said DMA-transfer means starts.

7. The apparatus according to claim 1, wherein said printing means includes a controller for controlling a printing operation of the printing apparatus.

8. A control method of a printing apparatus for managing a plurality of reception buffers in the apparatus upon performing printing on a print medium by a printing means, the method comprising:

performing by a receiver a reception step of receiving data in units of packets via a wireless interface from an external device and temporarily storing the received data into the plurality of reception buffers; and performing by a controller:

a transfer step of DMA (Direct Memory Access)-transferring the data stored in the plurality of reception buffers to a memory means for storing data to be printed by the printing means according to a printing status of the printing apparatus so that the printing pri-nt-means prints based on the transferred data;

a confirmation step of confirming a number of empty reception buffers of the plurality of reception buffers;

a comparison step of comparing the number of the empty reception buffers confirmed at said confirmation step with a predetermined value upon receiving the data at said reception step;

a packing step of packing the data stored in said plurality of reception buffers in one reception buffer until the one reception buffer becomes full, in accordance with a comparison result obtained at said comparison step; and a releasing step of releasing, as an empty reception buffer, a reception buffer of the plurality of reception buffers, from which the data has been completely read out by a packing process performed at said packing step whereby the reception buffers are managed to optimize a rate of receiving the data by the printing apparatus.

* * * * *